(12) United States Patent
Gokturk et al.

(10) Patent No.: US 10,356,629 B2
(45) Date of Patent: Jul. 16, 2019

(54) MESH ISLANDS

(71) Applicant: AIRTIES KABLOSUZ ILETISIM SAN. VE DIS TIC. A.S., Istanbul (TR)

(72) Inventors: Muharrem Sarper Gokturk, Istanbul (TR); Eren Soyak, Istanbul (TR); Metin Ismail Taskin, Istanbul (TR)

(73) Assignee: AIRTIES KABLOSUZ ILETISM SAN. VE DIS TIC. A.S., Istanbul (TR)

( * ) Notice: Subject to any disclaimer, the term of this patent is extended or adjusted under 35 U.S.C. 154(b) by 206 days.

(21) Appl. No.: 14/757,422

(22) Filed: Dec. 23, 2015

(65) Prior Publication Data

US 2016/0192203 A1  Jun. 30, 2016

Related U.S. Application Data

(60) Provisional application No. 62/096,604, filed on Dec. 24, 2014.

(30) Foreign Application Priority Data

Jan. 23, 2015  (GB) .................................. 1501169.5
Dec. 22, 2015  (EP) .................................. 2015 080948

(51) Int. Cl.
*H04L 12/28* (2006.01)
*H04W 16/20* (2009.01)
(Continued)

(52) U.S. Cl.
CPC ........... *H04W 16/20* (2013.01); *H04L 12/403* (2013.01); *H04L 41/083* (2013.01);
(Continued)

(58) Field of Classification Search
None
See application file for complete search history.

(56) References Cited

U.S. PATENT DOCUMENTS

2007/0060150 A1  3/2007  Hart
2008/0291846 A1  11/2008  Lu
(Continued)

FOREIGN PATENT DOCUMENTS

WO  WO-2007/016118 A1  2/2007
WO  WO-2014/124024 A2  8/2014

OTHER PUBLICATIONS

Xue Yang et al., "On Physical Carrier Sensing in Wireless Ad Hoc Networks", INFOCOM 2005, 24th Annual Joint Conference of the IEEE Computer and Communications Societies, Proceedings IEEE Miami, FL, Mar. 13-17, 2005, Piscataway, NJ, vol. 4, Mar. 13, 2005, pp. 2525-2535, XP010829280, ISBN: 978-0-7803-8968-7 the whole document.

(Continued)

*Primary Examiner* — Phirin Sam
(74) *Attorney, Agent, or Firm* — Harness, Dickey & Pierce, P.L.C.

(57) ABSTRACT

A network device operable with a hybrid mesh network having a plurality of network and client devices, comprising: a processor, a memory, and a first independently addressable network interface and a second independently addressable network interface, the first network interface and the second network interface being adapted to enable multiple communication pathways within the hybrid mesh network wherein the network device is configured to determine communication characteristics of one or more of the multiple communication pathways thereby to enable determination of optimization of communication within the hybrid mesh network by partitioning of the hybrid mesh network into two or more mesh islands wherein communication within each mesh island is non-overlapping with the another of the mesh islands.

20 Claims, 8 Drawing Sheets

(51) Int. Cl.
  *H04L 12/403* (2006.01)
  *H04L 12/24* (2006.01)
  *H04L 12/26* (2006.01)
  *H04W 40/12* (2009.01)
  *H04W 88/10* (2009.01)
  *H04W 84/18* (2009.01)

(52) U.S. Cl.
  CPC ...... *H04L 41/0823* (2013.01); *H04L 41/0873* (2013.01); *H04L 41/0893* (2013.01); *H04L 43/0876* (2013.01); *H04L 43/0882* (2013.01); *H04L 43/0888* (2013.01); *H04L 43/0894* (2013.01); *H04W 40/12* (2013.01); *H04W 84/18* (2013.01); *H04W 88/10* (2013.01)

(56) References Cited

U.S. PATENT DOCUMENTS

| | | | |
|---|---|---|---|
| 2009/0189981 A1* | 7/2009 | Siann | H04N 7/183 348/143 |
| 2010/0046417 A1 | 2/2010 | Tamura | |
| 2011/0007690 A1* | 1/2011 | Chang | H04W 48/20 370/328 |
| 2012/0114063 A1* | 5/2012 | Bo | H04L 27/2647 375/285 |
| 2012/0320924 A1* | 12/2012 | Baliga | H04L 45/125 370/400 |
| 2013/0083701 A1* | 4/2013 | Tomic | H04L 12/462 370/255 |
| 2013/0136117 A1* | 5/2013 | Schrum, Jr. | H04W 88/06 370/338 |
| 2013/0159760 A1* | 6/2013 | Chen | H04L 12/413 713/401 |
| 2013/0322445 A1* | 12/2013 | Klein | H04L 12/5692 370/392 |
| 2014/0036724 A1* | 2/2014 | Castagnoli | H04L 45/02 370/254 |
| 2014/0098796 A1 | 4/2014 | Xue et al. | |
| 2014/0269260 A1 | 9/2014 | Xue | |
| 2014/0269691 A1* | 9/2014 | Xue | H04L 45/125 370/389 |
| 2014/0301217 A1* | 10/2014 | Choi | H04W 28/08 370/252 |
| 2015/0049650 A1* | 2/2015 | Choi | H04W 28/08 370/278 |
| 2015/0373572 A1* | 12/2015 | Sahin | H04W 72/1231 370/252 |
| 2016/0037550 A1* | 2/2016 | Barabell | H04B 17/318 455/450 |

OTHER PUBLICATIONS

International Search Report dated Mar. 24, 2016 for International Application No. PCT/EP2015/080948.
United Kingdom Intellectual Property Office Search Report for Application No. GB 1501169.5 dated Jun. 25, 2015.

* cited by examiner

Figure 9

MESH ISLANDS

BACKGROUND TO THE INVENTION

The present invention generally relates to wireless networking and, more particularly, but not exclusively, to a wireless mesh network where nodes may communicate via different communication standards such as IEEE 802.11 a/b/g/n/ac or IEEE 802.15.4 or Bluetooth standards, as well as power line communication (PLC) standards such as IEEE P1901 or HomePlug AV or G.hn (G.9960), Ethernet networks where nodes may communicate via different communication standards such as IEEE 802.3, and multimedia over coaxial alliance (MoCA) networks where nodes may communicate via different communication standards such as MoCA 1.1 or MoCA 2.0.

A wireless network consists of at least an access point (AP) and a station (STA) that is connected to this AP via its wireless interface. One of the major issues a wireless network with a single AP encounters is the limited wireless coverage area. Although wireless coverage can be increased by using a higher transmit power and/or employing lower modulation and coding schemes to improve transmitted signals' susceptibility to noise, fading and path-loss, there is still a physical limit for the coverage of a single AP due to not only regulations that restrict power emission but also physical capabilities of transceiver hardware.

Wireless networks, such as Wi-Fi networks, rely on carrier sense multiple access (CSMA) type of channel access, which means that each node first listens to, and then accesses the medium when no one is using it. In this kind of shared media, as the number of users that share the common medium is increased, per node utilization of the medium is degraded. Compare a network with two nodes, e.g., an AP and a STA, to a network with three nodes, e.g., an AP and two STAs. Whereas in the former network, STA can access the medium when it demands, thus utilizing the capacity alone, in the latter network, the two STAs have to share the medium between each other, since these two STAs cannot use the medium simultaneously.

An important point is that medium access mechanisms, such as IEEE 802.11, etc., bring protocol overhead, which degrades the overall network throughput. This protocol overhead is a result of the MAC mechanisms, such as control messaging for virtual carrier sensing, that are used to prevent collisions, i.e., unintended simultaneous transmissions by different nodes in the same carrier sense range.

Hence, it can be said that as the number of nodes that use the same communication medium increases, the amount of traffic per node is reduced. That is why, especially, networks that necessitate stringent QoS requirements carry QoS traffic on orthogonal medium, which is not shared with other traffic.

BRIEF SUMMARY OF THE INVENTION

In order to mitigate for at least some of the above described problems, there is provided a network device operable with a hybrid mesh network having a plurality of network and client devices, comprising: a processor, a memory, and a first independently addressable network interface and a second independently addressable network interface, the first network interface and the second network interface being adapted to enable multiple communication pathways within the hybrid mesh network wherein the network device is configured to determine communication characteristics of one or more of the multiple communication pathways thereby to enable determination of optimization of communication within the hybrid mesh network by partitioning of the hybrid mesh network into two or more mesh islands wherein communication within each mesh island is non-overlapping with the another of the mesh islands.

Further, there is provided a method of operating a mesh network, the method comprising the steps of, at a network device operable with a hybrid mesh network having plurality of network and client devices: determining communication characteristics of one or more of multiple communication pathways within the hybrid mesh network thereby to enable determination of optimization of communication within the hybrid mesh network by partitioning of the hybrid mesh network into two or more mesh islands wherein communication within each mesh island is non-overlapping with the another of the mesh islands.

This invention proposes a topology control method for communication networks consisting of communication devices, wherein each device may have multiple, or a combination of, or all of Wi-Fi, PLC, Ethernet, MoCA, Bluetooth, ZigBee, etc. interfaces. The method described in this document controls the network topology such that the combined capacity of all available physical media can be utilized for maximized end-to-end throughput in the network, while Quality of Service (QoS) requirement per flow is satisfied.

The proposed invention builds on the fact that nodes, specifically Access Points (APs), Video Bridges (VBs), Set-top Boxes (STBs) can have multiple network interfaces, such as, but not limited to, multiple Wi-Fi interfaces (2.4 GHz and 5 GHz), PLC interfaces, MoCA interfaces, Ethernet interfaces, etc. The proposed invention makes smart use of all possible communication interfaces available at nodes in the network to provide a self-configuring, self-maintaining, easy-to-use, high-speed hybrid media mesh network.

Each communication device in the Hybrid Media Mesh Network may have more than one radio for Wi-Fi communication, such that one or multiple radios provide access to wireless clients such as laptops, tablets and smartphones, while at the same time these communication devices use the same or the remaining (i.e., not used for serving clients) radios for the communication over a hybrid media mesh; thus, the coverage area of the wireless network is maximized by using the hybrid mesh network infrastructure as a backbone.

The proposed method consists of a mesh network partitioning method with topology control algorithm, channel selection and channel re-entry method, as well as a bottleneck discovery method.

An application entitled "Hybrid Mesh Network" (HyMN) was filed: in the USPTO on 28 Jan. 2014 and has the publication number US 2015/0055506 A1; and in the EPO on 9 May 2014 and has the publication number EP 2840 860 A1. The content of all of these applications is incorporated by reference into this patent application as if fully set forth herein. In one embodiment, the hybrid mesh network explained in this invention is HyMN-capable, in that routing is carried out as specified therein.

BRIEF DESCRIPTION OF THE DRAWINGS

Embodiments of the invention are described, by way of example only, with reference to the accompanying drawings, in which:

FIG. 9 is an exemplary table of channel information.

DETAILED DESCRIPTION OF THE INVENTION

A mesh network is capable of forming active physical wireless links between each AP in the network. Making use of these mesh links, traffic can be routed from the source node to the sink node by using any combination of these links. This way, mesh networks are able to route traffic within the network such that the end-to-end throughput can be maximized. Furthermore, wireless mesh networks can be configured to select routes which consider and optimize various different criteria, such as end-to-end delay, end-to-end jitter, total network throughput, etc.

APs are provided with other forms of communication interfaces beside Ethernet and single band wireless communication, such as dual-band concurrent wireless communication, power line communication (PLC), Multimedia over Coaxial (MoCa), 60 GHz transceivers, etc. As these interfaces are integrated into APs, networking using inter-AP mesh connectivity on each interface can be provided, and as well as intra-AP interface connectivity between available interfaces on the AP.

In maximizing end-to-end wireless coverage and maximizing the end-to-end deliverable traffic (throughput), hybrid mesh networks play a significant role, as they can enable multiple orthogonal, i.e., independent and non-overlapping, interfaces simultaneously. Note that two interfaces are called orthogonal, as understood by the skilled person, if they use completely independent transmission media, thus providing simultaneous communication at both interfaces without one interface interfering with the communication in the other interface. Utilizing a plurality of interfaces concurrently to route multiple flows in the network can boost the network throughput considerably.

A mesh islands method is developed from the fact that, if the connectivity of the network can be maintained, while QoS requirements are satisfied, then the network can be partitioned into subsets that have at least one common communication interface, and at least one orthogonal communication interface. Partitioning the network into subsets, called mesh islands, that employ orthogonal communication media can improve the throughput performance significantly.

A subset of the mesh network, which has at least one orthogonal interface to other subsets in the mesh network, and at the same time, which is connected to the other subsets of the mesh network through one or more common interfaces, is called a "mesh island". A mesh island comprises as a minimum a mesh AP, and clients (stations) that are connected to the mesh AP.

The common interface(s) among the mesh nodes can be Wi-Fi, PLC, Ethernet or MoCA, and the network can be partitioned on a different interface. For example, in one embodiment of the invention, Ethernet and/or PLC can be employed as the common mesh interface that connects the mesh islands, while different non-overlapping, non-interfering, channels of a Wi-Fi 5 GHz interface are used to create orthogonal media for the mesh islands.

Figure 1:
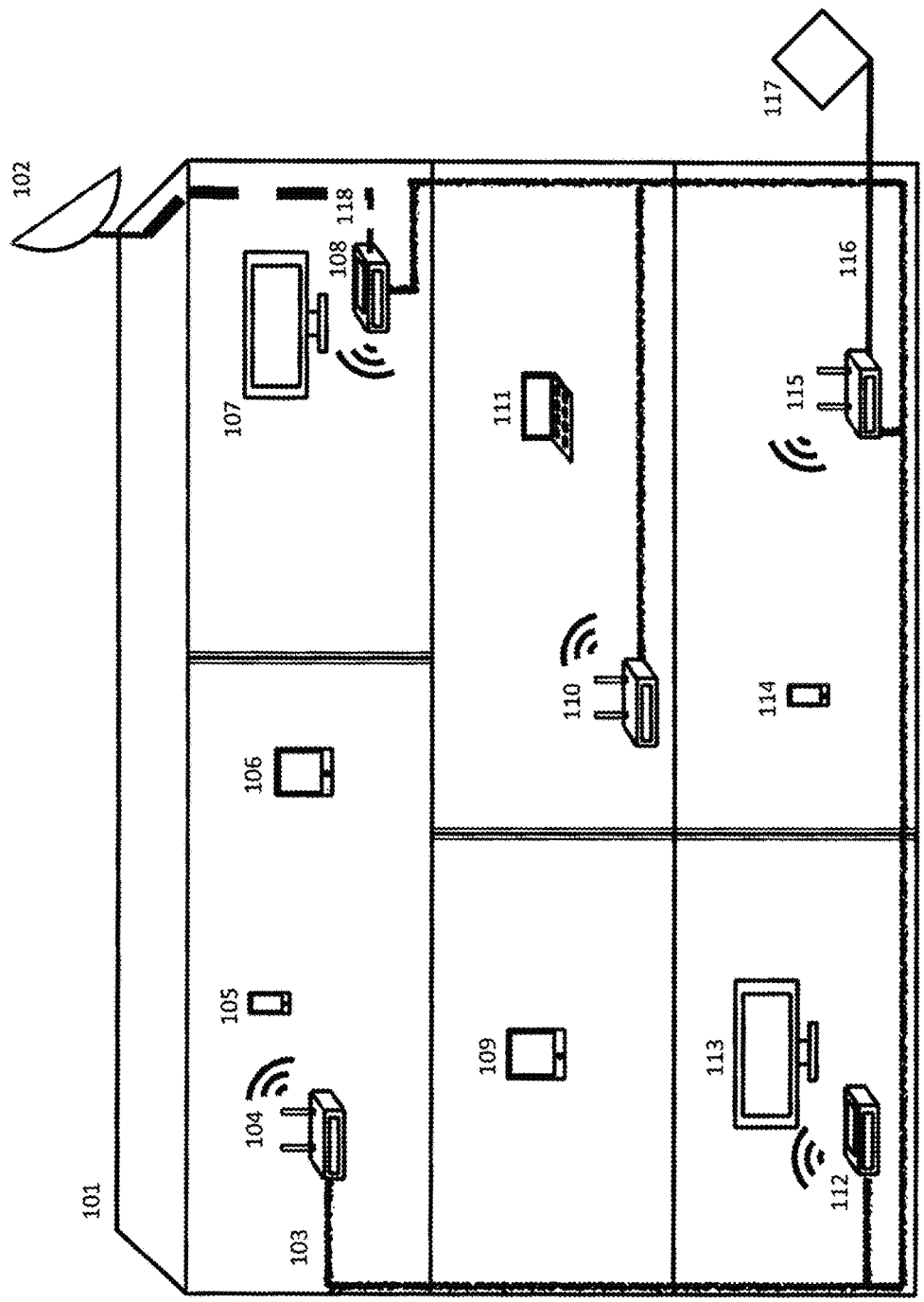
FIG. 1 is a schematic of an example home network.

FIG. 1 shows an example network that may comprise any combination of STBs, APs, a gateway, smart phones, laptop computers, smart TVs and VBs. A satellite connection is brought to a home network via one of the STBs deployed in the home. An Internet connection is brought to the home network via a gateway. Video content is delivered to the clients in the home network via VBs. HyMN capable nodes, specifically, STBs, APs and VBs, preferably have multiple network interfaces, such as multiple Wi-Fi interfaces (through multiple radios), PLC interfaces, MoCA interfaces, and/or Ethernet interfaces.

In the specific embodiment shown in FIG. 1. 117 is a gateway (GW), and 115 is an AP with at least two network interfaces, such as, but not limited to, Wi-Fi with multiple radios, PLC and or Ethernet. 109 is a VB with at least one network interface, such as, but not limited to, Wi-Fi with single or multiple radios, PLC and/or Ethernet. 114 and 105 are smart phones with one or more wireless network interfaces, such as, but not limited to, 2.4 GHz and/or 5 GHz Wi-Fi, or multiple radios. 103 is a power line to which PLC interfaces are connected. 107 is a smart TV with at least one network interface. 108 is a STB with multiple network interfaces, such as, but not limited to, Wi-Fi with multiple radios and/or PLC. 108 has a satellite link. 106 and 109 are tablet computers with at least one wireless network interface, such as, but not limited to, 2.4 GHz and/or 5 GHz Wi-Fi, or multiple radios. 111 is a laptop computer with at least one network interface, such as, but not limited to, Ethernet, and Wi-Fi with multiple radios. 102 is a satellite link. 116 is Ethernet. 118 is coaxial satellite data cable.

Figure 2:
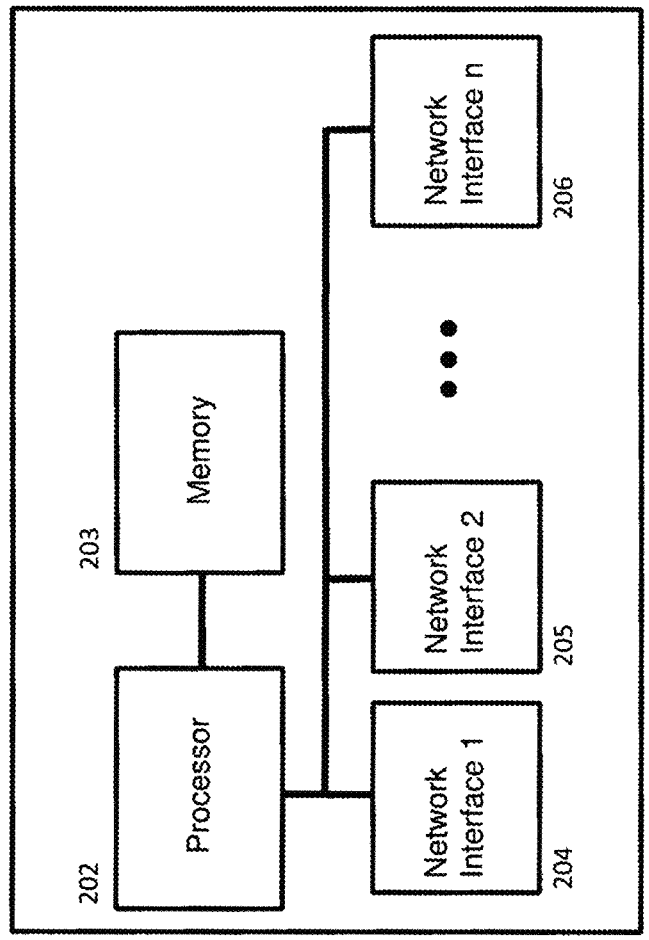
FIG. 2 is a schematic of a network device in accordance with an embodiment of the invention.

FIG. 2 depicts a hybrid mesh network mesh island method capable node.

In a mesh islands capable network, one or more subsets of mesh nodes of FIG. 1, can be formed in distinct Wi-Fi channels, while connectivity of the entire mesh network is satisfied. Thus, for example, 104 and 108 can form a mesh island in Wi-Fi 5 GHz band, whereas 110, 112 and 115 form another mesh island. These two mesh islands operate in separate, distinct Wi-Fi 5 GHz channels, while the network connectivity is assured via the other interfaces, such as but not limited to other Wi-Fi interfaces, Ethernet, PLC and/or MoCA. The network throughput can be significantly improved by concurrent utilization of Wi-Fi links, by leveraging the proposed mesh islands method.

In a mesh islands capable network, each AP gathers local information, in terms of (i) clear channel assessment (CCA) of each Wi-Fi channel, (ii) the actual amount of Wi-Fi traffic carried through this AP, (iii) the estimated capacity of each mesh link going out and coming into this AP.

Each mesh AP distributes its local measurements to the other APs in the mesh network via periodic information announcements. These periodic announcements can be unicast or broadcast through all available interfaces to reach all APs within the mesh network. The reason behind sending the information from all available interfaces is to prevent packet losses, and to disseminate the full-network state information to all mesh APs, whether they do, or do not, share all the interfaces with the other APs in the network. This way, a mesh AP, say node X, that only has PLC capability will have Wi-Fi information of the other APs in the network, and likewise, the other nodes know that node X has only PLC capability, but no Wi-Fi capability.

Figure 9:
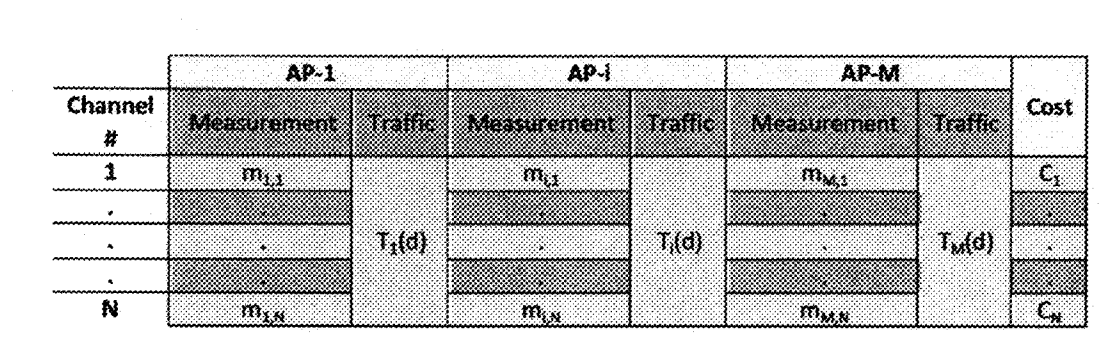

Each AP maintains a table as depicted in FIG. 9. Assuming that FIG. 9 depicts the Channel Information Table maintained by AP-1. AP-1 gathers the measurement data for each channel via periodic channel scans. The period of these channel scans is a configurable parameter, which depends on the traffic on the AP.

In one embodiment of the proposed invention, channel scans are carried out in periodic "scan epochs", in which all APs in the mesh network, or in case there are multiple mesh islands in the mesh network then all APs in a mesh island, perform channel scan. All APs in the mesh network (or in the mesh island, if the mesh network is composed of mesh islands) halt their transmissions during scan epoch, by freezing the transmit queues for the duration of scan epoch. All APs continue their transmissions right after the end of the scan epoch. The length of the scan epoch is a configurable parameter, and it depends on the number of channels to be scanned, total time spent for scanning a channel, and time spent to switch to channel for scanning.

The synchronization required for the APs to begin the scan epoch at the same time is provided by periodic broadcast announcement messages sent by the master node. In one embodiment of the proposed invention, a master node is defined as the mesh AP that has the highest bridge MAC address. In another embodiment, a master node is the mesh AP, which is directly connected to a GW that is the dynamic host configuration protocol (DHCP) server. In the announcement message, the master node denotes the number of announcement messages until the start of the scan epoch. The number of announcement messages between scan epochs designate the time interval between the scan epochs. The interval between the scan epochs is a configurable parameter that designates how often scanning should be carried out. For example, if the scan epoch interval is determined as 1 s, and periodic announcement messages are sent every 200 ms, then after every 5 announcement messages a scan epoch begins. Specifically, at every announcement message the master node indicates the number of remaining announcement messages until the start of the scan epoch.

In a single scan epoch, APs can scan one or multiple channels with various bandwidths. The information on the channels to be scanned, and the information on the bandwidth of these channels is provided by the master node in the periodic announcement message. In one embodiment of the proposed invention, APs scan a single 80 MHz channel in a scan epoch. In further embodiments, the number of scanned channels, and the bandwidth of these channels are configurable parameters the values of which are decided based on the channel load. For example, APs can scan a single 80 MHz channel in one epoch, and scan 4 different 80 MHz channels in 4 consecutive scan epochs to scan all available channels in the entire 5 GHz band.

Measurements, i.e., scans, of APs need not be fully synchronized, that is to say, it is not required to have all APs scan the same channels exactly at the same time. However, each AP scans the designated channels within the same scan epoch. Scan epoch not only provides a means of synchronization among the APs to start the scan process at overlapping time instances, thus having the APs get almost the same snapshot of the channel, but also provides a period of no transmission from within the mesh network, thus eliminating any bias on the channel measurements due to the traffic carried by the mesh network in the very instance of channel scanning.

The scan results, i.e., measurements by AP-i, in channel j are stored in an array $m_{i,j}$. In one embodiment of the invention, $m_{i,j}$ comprises CCA measurement, i.e., the percentage of idle times that can be utilized. In another embodiment, background noise (in dBm) can make up $m_{i,j}$. In further embodiments, a function of CCA and background noise can be used as a means to obtain a composite scan result. Here, while CCA provides information on the availability of a channel, information gathered via background noise is useful for selecting a channel that can provide a better signal-to-noise-ratio (SNR). In one embodiment of the invention, $m_{i,j}$ for AP-1 and for channel 36 is as follows in Equation 1:

$$m_{1,36}=[80,82,80,\ldots,50,48]. \quad \text{Equation 1}$$

In the above example $m_{1,36}$, the CCA results range from 0 to 100: 0 means there is no idle time, whereas 100 corresponds to a completely idle channel. For example, the first sample, 80, represents that according to AP-i channel j is measured to be idle 80% of the time. The number of rows in $m_{i,j}$ is equal to the number of channel measurement samples. For processing and decision purposes, APs store measurement samples taken within the last predetermined, but configurable, period of time. In one embodiment of the invention, this predetermined time is determined as 1 hour.

Figure 5:
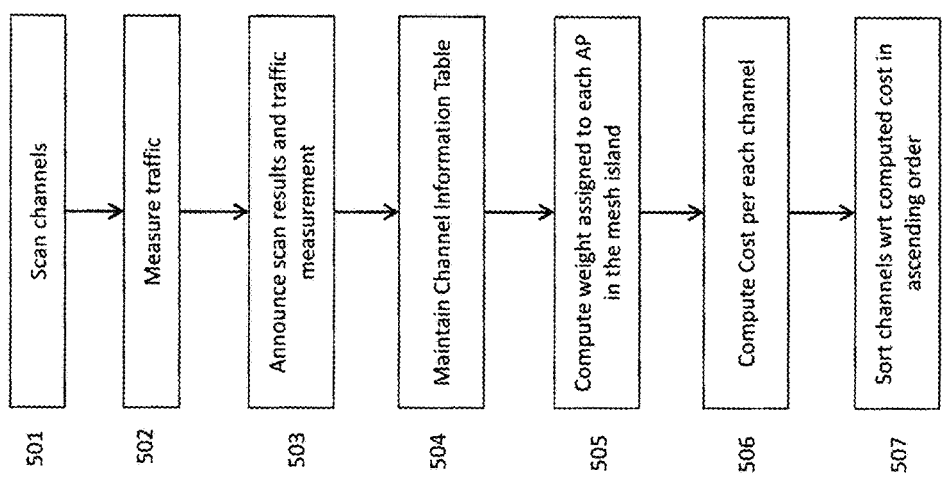
FIG. 5 is a flowchart of a method of determining the best communication channel.

Each mesh AP distributes its channel measurements to the other APs in the mesh network via periodic broadcast messages. In particular, each AP distributes the processed version of the scan results, called $\overline{m}_{i,j}$, it obtained since its latest announcement. The goal of processing the scan results is to obtain meaningful minimal information that can represent the channel quality from the perspective of the measuring node. This way the amount of information being exchanged is reduced. In one embodiment of the invention, $\overline{m}_{i,j}$ can be obtained by taking a moving average of the latest n samples, where n is a configurable parameter. In further embodiments, $\overline{m}_{i,j}$ can be obtained by applying a filter over the last n samples, such as a median filter. In other embodiments, more complex filters (functions) can be applied on the raw measurement data, $m_{i,j}$, to obtain $\overline{m}_{i,j}$.m The mesh partitioning method makes use of a channel selection mechanism, which takes into account the measurements of all APs that constitute the mesh network. FIG. 5 depicts the flow chart of an example channel selection method that can be used with the proposed invention.

The measurement array, namely $\overline{m}_{i,j}$ of each AP in the mesh network is weighted with a variable $w_{i,j}$. In one embodiment of the proposed invention, the weight assigned to AP-i is a function of the total Wi-Fi traffic on AP-i. Then, these weighted measurements are used to compute a cost metric for each channel. The cost of using channel j is computed as follows in Equation 2:

$$C_j = f(w_{i,j}, \overline{m}_{i,j}). \quad \text{Equation 2}$$

In one embodiment of the proposed invention, the cost of operating at a channel is computed by weighting the measurements of each AP by a variable determined by the amount of traffic carried on that AP. In other embodiments of the invention, the weight can be determined based on other parameters, such as but not limited to link capacity in terms of bits-per-second.

Let $X_{i,k}$ denote the traffic incoming to AP-i through link k, and let $y_{i,l}$ designate the traffic outgoing from AP-i through link 1. Then, the amount of traffic carried over Wi-Fi interface of AP-i for a duration of d seconds is computed as follows in Equation 3:

$$T_i(d) \Sigma_{k \in W_S} x_k(d) + \Sigma_{k \in W_S} y_k(d), \quad \text{Equation 3}$$

where $W_5$ designates a Wi-Fi 5 GHz interface. The total amount of traffic carried on an interface can be obtained by observing receive and transmit packet counters of that specific Wi-Fi interface's driver. d is a configurable parameter, which can be changed during run-time. If d (in seconds) is small, then the most recent traffic is accounted for. However, if d is large, then traffic in a wide time horizon is taken into account.

In one embodiment of the invention, $x_k(d)$ and $y_k(d)$ is a function of d, such as shown in Equation 4, $$x_k(d) = \sum_{i=0}^{d} x_k(i).$$ Equation 4

In further embodiments of the invention, $x_k(d)$ and $y_k(d)$ can be more complex functions of x, y and d.

Each AP, e.g. AP-i, computes $T_i(d)$, and announces this information together with its measurement information, $\overline{m}_{i,j}$. The announcement messages are periodic and are disseminated through all available interfaces. The period of announcement messages is set equal to or multiple of beacon interval. In one embodiment, announcement messages are sent every 500 ms.

An AP that has received announcement messages from the other APs in the mesh network, have a complete Channel Information Table as depicted in FIG. 9.

An AP computes the weight assigned to AP-i, based on the traffic information gathered from all APs, and assuming that there are N APs in the mesh network, as follows: $w_i = g_i(T_1(d), \ldots, T_N(d))$. In one embodiment of the invention, $g_i(.)$ is computed as follows in Equation 5:

$$w_i = T_j(d) / \sum_{k=1}^{N} T_k(d)$$ Equation 5

Thus, weight assigned to AP-j is defined as the ratio of the total Wi-Fi traffic on AP-j and the total Wi-Fi traffic on the mesh network.

In one embodiment of the invention, cost assigned to channel j is obtained via calculating the weighted average of measurements from every AP in the mesh network, as follows in Equation 6:

$$C_j = \sum_{k=1}^{N} w_k \overline{m}_{k,j}$$ Equation 6

In another embodiment of the invention, cost assigned to channel j is the maximum cost among all APs in the mesh network, as follows in Equation 7:

$$C_j = -\max w_k \overline{m}_{k,j}$$ Equation 7

After the costs are computed, channels are sorted in ascending order of their costs. The best channel is the one that provides the minimum cost among others, i.e., the best channel is the first channel in the sorted list, second best channel is the second in the list, and so on. It shall be noted that $m_{i,k}$ is a positive number, and $w_k$ is ratio of two positive numbers; thus, $w_k \overline{m}_{i,j}$ is always positive. In order to have a cost function that is inversely proportional to channel quality, i.e., $\overline{m}_{i,j}$, $w_k \overline{m}_{i,j}$ is multiplied by −1. By using this process, APs that carry more traffic than the other mesh nodes, have priority on the decision of which channel to select.

Note that in one embodiment of the invention, the weight assigned to each AP can be a function of traffic, whereas in further embodiments, single or a plurality of parameters such as, link capacity (in terms of bits per second) and/or airtime utilization per link can be employed for weighting.

An example channel information table, Table 1, and cost calculation according to the embodiment in which the AP computes the weight assigned to AP-i, based on the traffic information gathered from all APs is shown below for 2 APs and 2 possible channels:

TABLE 1

| AP/Channel | $w_i$ | Channel 1 | | Channel 2 | |
|---|---|---|---|---|---|
| | | $m_{i,1}$ | $C_1$ | $m_{i,2}$ | $C_2$ |
| AP-1 | 0.75 | 60 | −45 | 50 | −37.5 |
| AP-2 | 0.25 | 90 | −22.5 | 50 | −12.5 |
| Cost | | | −22.5 | | −12.5 |

According to the example table, Table 1, the best channel, i.e., the channel with the least cost is found as Channel 1, and the second best channel is found as Channel 2.

Each AP maintains the same table, and thus, computes the same best channel list. This is a result of the fact that each AP shares its local information, in terms of channel measurements, and weight information, with all other APs in the mesh network.

Each AP in the mesh network maintains the best channel list, and updates this list as new information on channel state traffic is received. The APs do not switch channels unless a channel switch message is received.

Although each AP maintains the same channel information table and each AP computes the same best channel list, nodes do not switch to the best channel in their lists immediately. A master node is selected among the mesh APs to decide, to announce and to actuate the channel switch. Using a master node to trigger channel switch, not only prevents possible overlapping channel switch announcements by multiple APs, but also provides a synchronous channel switch within the mesh network. In one embodiment of the invention, the master node can be the node that is directly connected to the gateway; or in further embodiments, AP that has the biggest Wi-Fi 5 GHz MAC address or the AP that runs dynamic host configuration protocol (DHCP) can be selected as the master node.

The goal of mesh partitioning is to maximize the total traffic that can be delivered within the mesh network. In a typical Wi-Fi mesh network, given that all nodes must use the same Wi-Fi channel, due to a lack of extra interface(s) that can provide connectivity within the network, selecting a single best channel maximizes the Wi-Fi throughput in the mesh network. However, if full network connectivity can be provided by means of other media, other than the specific Wi-Fi interface, such as another Wi-Fi interface, Ethernet, PLC or MoCA, separate Wi-Fi mesh islands, which use distinct Wi-Fi channels, can be created within the mesh network. The distinct Wi-Fi channels employed by the mesh islands are chosen from the best channel list.

Figure 6:
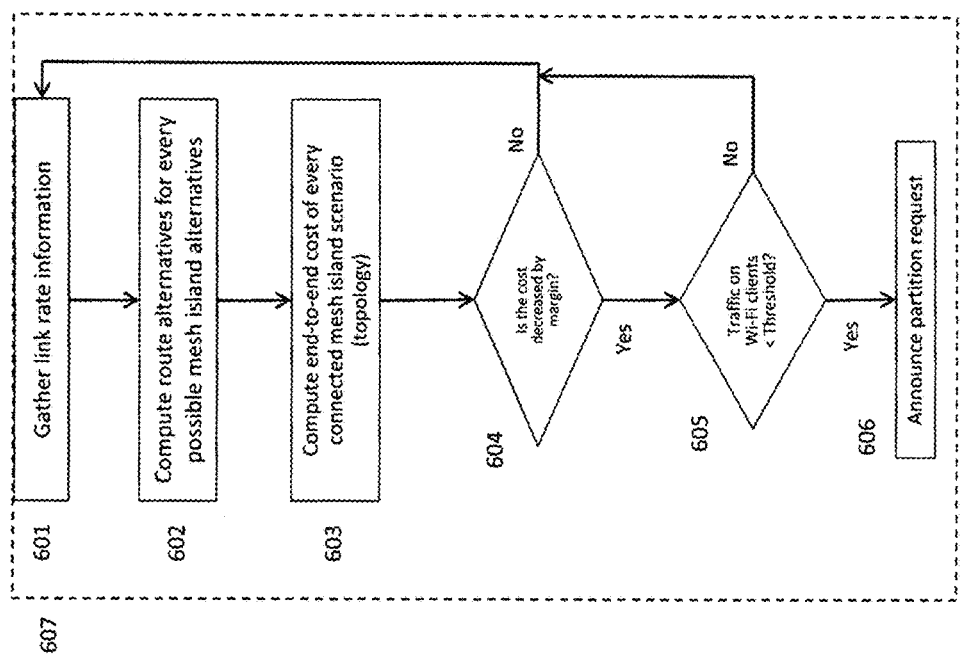
FIG. 6 is a flowchart of a method of determining partitioning of a mesh network.

FIG. 6 depicts a flow chart for the mesh network partitioning method.

In order to maximize the amount of total traffic carried in the mesh network, it is of paramount importance to partition the network through the links, replacement of which can provide the maximum improvement.

In order to identify which links to replace with alternative interfaces, all possible end-to-end routes, and their corresponding costs (inversely proportional to capacity) are computed for all possible topologies (that correspond to different mesh island scenarios with a full connected mesh network). Among the possible topology alternatives, one alternative minimizes the cost, i.e., maximizes the total capacity, in the mesh network. If that alternative corresponds to a mesh network with mesh islands, then the network is partitioned according to the found topology.

A hysteresis is applied while deciding on whether to partition the network or not. That is to say, the network topology is not changed unless the network cost that would be obtained by the new topology is lower than the current network cost by at least a certain margin. In one embodiment of the invention, cost is in terms of throughput, and this margin is defined as a percentage of the current network throughput.

In one embodiment of the invention, the cost (inversely proportional to capacity) of each route alternative can be calculated as defined in "Hybrid Mesh Network", which was filed in the USPTO on 28 Jan. 2014 and assigned Ser. No. 14/166,040; assigned in the EPO on 9 May 2014 and assigned Ser. No. EP14167788.0. The content of all of these applications is incorporated by reference into this patent application as if fully set forth herein. A routing and route cost calculation is summarized below:

A Hybrid Mesh Network node estimates the cost of communicating with a neighbor over each possible physical interface via which it can communicate with the neighbor. In an example, the cost of transmitting over a link is the estimated duration for which the communication medium is used; this quantity is inversely proportional to the available bandwidth or throughput on a communication link. The greater the throughput on a link, the lower becomes the cost on this link. For shared-medium communication systems, (e.g., Wi-Fi, PLC) this cost not only reflects the cost of the transmitting node, but it also reflects the cost incurred on the network while the transmitter transmits (i.e., the cost incurred on the other nodes in the network that are in the same "collision domain" with the transmitter).

According to one exemplary aspect of the proposed invention, the communication device updates its estimation of its link costs when triggered by the receipt of a route request (RREQ) packet, or when it needs to send an RREQ. In a further embodiment, the Hybrid Mesh Network node may only refresh its estimate of link costs periodically, or refresh periodically in addition to when triggered.

In this example, there are three operations that are defined in respect of the cost metric, namely addition, comparison, and reading, which are respectively represented as $+'$, $<'$ and $>'$, and read'.

The cost of transmitting over a route is a function of the costs incurred on each communication medium that is used along the route. The read' gives a function of the total cost along a route. The cost of a route between source node S and destination node D is represented as $C_{S,D}$. If there are M different collision domains in the mesh network, the cost of a route between source node S and destination node D is represented as in Equation 8:

$$C_{S,D} = \text{read}' \begin{pmatrix} \text{total cost from } S \text{ to } D \text{ in collision domain 1} \\ \text{total cost from } S \text{ to } D \text{ in collision domain 2} \\ \vdots \\ \text{total cost from } S \text{ to } D \text{ in collision domain } M \end{pmatrix} \quad \text{Equation 8}$$

For shared-medium communications, the cost of the links along the route that are in the same collision domain are aggregated via a function $+'$ that substitutes the straightforward addition; this is because the links in these media interfere with each other when used simultaneously, therefore they need to be used exclusively, thereby causing addition of link costs. For communications that do not interfere with each other (e.g. Ethernet), the cost of the links on the same path are combined via a max( ) operation, as links in this medium bottleneck each other.

In one embodiment of the invention, read' in Equation 8 is the max( ) operation; it gives the maximum of the costs incurred in different communication media used along the route between source and destination. In other words, cost of the route deduces to the cost incurred in the bottleneck communication medium used along the route.

The comparison operation, represented $<'$, is used in this example of routing in a Hybrid Mesh Network, in comparing two cost metrics. This operator takes in two metrics and outputs the one that is "smaller". In one exemplary embodiment of the proposed invention, $<'$ reduces to $<$; in a further embodiment of the proposed invention, if the "smallness" of a metric is defined in another way, $<'$ operator may perform the corresponding comparison.

According to one exemplary embodiment of the proposed invention, if a tie occurs in comparing the costs along two routes, i.e., if the max( ) values along two routes have an equal cost (when it happens that the cost of the bottleneck medium is the same whereas the bottleneck medium may be the same or different), the tie is broken by comparing the sum of the costs incurred on all available communication media when the corresponding routes are used. As an example, $$\begin{pmatrix} 12 \\ 5 \\ 2 \end{pmatrix} =' \begin{pmatrix} 9 \\ 12 \\ undef \end{pmatrix} = 12;$$

in this case, we compare 12+5+2 with 9+12 in determining whether the former route or the latter route has a smaller cost.

Figure 3:
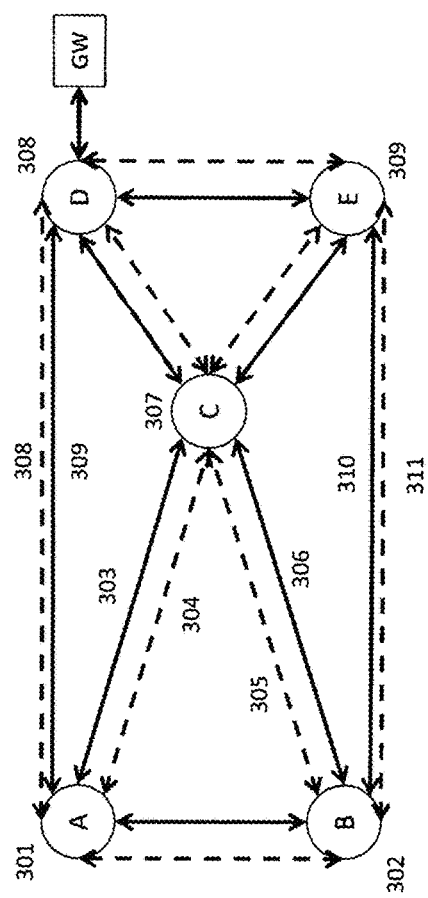
FIG. 3 is a schematic of an exemplary mesh network.

Consider the example scenario given in FIG. 3. In order to demonstrate the route selection and network partitioning method, the cost of using each link is taken as follows:

PLC links: A-B: 50, A-C:50, A-D:65, B-C:55, B-E:60, C-D:50, C-E:50, D-E:55,

Wi-Fi 5 GHz links: A*B: 10, A*C:90, A*D:94, B*C:82, B*E:95, C*D:30, C*E:30, D*E:20.

Here, "-" designates a PLC link, and "*" designates a Wi-Fi 5 GHz link. Costs are normalized with respect to 100; thus minimum cost is 0, and the maximum cost is 100. If there is no connection between any two pair of nodes, then the cost is assumed to be infinite. Note that the PLC and Wi-Fi 5 Ghz links with infinite costs are not listed above.

According to an example of routing in a Hybrid Mesh Network, the best route between nodes A and E is found by computing and comparing all route alternatives which are obtained via exchange of route request (RREQ) and route reply (RREP) messages. For example, the cost of the route from A to E that uses Wi-Fi for going from A to B, and that uses PLC for going from B to E is computed as follows in Equation 9:

$$C_{A,E} = \begin{bmatrix} Wi-Fi \text{ cost of } AtoB \\ PLC \text{ cost of } BtoE \end{bmatrix} = C_{A,E} = \max \begin{bmatrix} 10 \\ 60 \end{bmatrix} = 60. \quad \text{Equation 9}$$

Note that the above is the path with the minimum cost (60) among all possible route alternatives for reaching to E from A. Thus, in an example, routing in a Hybrid Mesh Network uses the Wi-Fi to reach from A to B, and utilizes PLC to deliver from B to E.

Consider the example scenario depicted in FIG. 3. There are 5 mesh nodes, all of which employ 2 orthogonal interfaces. Assuming that one interface is Wi-Fi 5 GHz, whereas the other interface is PLC. Note that mesh network is fully connected through all its interfaces.

In the network depicted in FIG. 3, if all mesh nodes operate in the same channel of Wi-Fi 5 GHz, the network can provide full connectivity over both Wi-Fi 5 GHz and PLC. However, if some of the Wi-Fi links are slow, these slow links will degrade the Wi-Fi performance of the entire mesh network. For example, in the topology depicted in FIG. 3, Wi-Fi links 303, 306, 309, 310 are weak, and they will slow down the entire network when they are used.

The proposed network-partitioning algorithm consists of the following steps. In one embodiment of the invention, every AP in the mesh network carries out the following steps, based on the information exchanged through periodic announcements between the mesh APs.

(1) Create a set of all possible network partitions. For example, for a network with APs A, B and C, possible network topologies are: {A, B, C}, {{A, B}, {C}}, {{A, C}, {B}}, {{A}, {B, C}}, {{A}, {B}, {C}}. The first one represents a single Wi-Fi mesh network, whereas the second one represents a network with two mesh islands consisting of {A, B} and {C}.

(2) For every topology do the following (2.a) Select the best channel for each mesh island in the network. The Wi-Fi channels of two different mesh islands shall be orthogonal and non-overlapping. If the best channel selected by two mesh islands are the same, then the mesh island that calculates the lowest cost for the selected channel gets the channel. The other mesh island gets the next channel in its best channels list.

(2.b) Compute the best end-to-end route costs for all possible source-destination pairs in the network using the method proposed in respect of routing in a Hybrid Mesh Network, and explained above. For example, consider the topology given in FIG. 4, in which there are 2 mesh islands, 401 and 402. In this topology, all possible source-destination pairs, and their costs are represented as $C_{A,B}$, $C_{A,C}$, $C_{A,D}$, $C_{A,E}$, $C_{B,C}$, $C_{B,D}$, $C_{B,E}$, $C_{C,D}$, $C_{C,E}$, $C_{D,E}$.

In this topology, the alternative paths to go from A to E are: A-C*E, A*B-C*E, A-D*E, A-E, A*B-E, A*B-D*E. Here, "*" designates a Wi-Fi link, and "-" designates a PLC link. Note that, the Wi-Fi links in different mesh islands use distinct, non-overlapping channels. In particular, in A*B-C*E, the channels used by Wi-Fi link A*B and C*E are different, e.g., A*B uses channel 36, whereas C*E uses channel 100. Using the cost computation method explained above, cost of each alternative path is calculated and the path that provides the minimum cost is selected as the best route. By this way, compute route costs for all possible source-destination pairs, namely $C_{A,B}$, $C_{A,C}$, $C_{A,D}$, $C_{A,E}$, $C_{B,C}$, $C_{B,D}$, $C_{B,E}$, $C_{C,D}$, $C_{C,E}$, $C_{D,E}$ for the example scenario.

(2.c) Using $C_{A,B}$, $C_{A,C}$, $C_{A,D}$, $C_{A,E}$, $C_{B,C}$, $C_{B,D}$, $C_{B,E}$, $C_{C,D}$, $C_{C,E}$, $C_{D,E}$, among all costs, find the minimum cost, find the maximum cost, compute the total cost in the network, compute average cost in the network, and compute the cost variance in the network.

(3) Select the topology combination that optimizes the cost of end-to-end communication in the network. In one embodiment of the proposed invention, the best topology is the one that minimizes the average cost incurred on the network while the variance is kept below a predetermined, but configurable, threshold, for example 10% of the average cost. In another embodiment, the best topology is the one that minimizes the maximum cost encountered in the network.

(4) If the selected topology is different from the current topology and the cost of the selected topology is less than the current topology's cost by margin, and there is negligible Wi-Fi traffic to Wi-Fi clients, then the node broadcasts a partition request message. In one embodiment of the proposed invention, this partition request message is broadcast through all possible interfaces of the mesh node. In further embodiments, this message can be unicast by the mesh node to all of its neighbors through all interfaces. In one embodiment of the invention, the margin is given as a percentage, e.g., 10% of the current topology's cost. The partition request message consists of the ID of each AP per mesh island, and the respective Wi-Fi channel per mesh island.

(5) When partition requests from all mesh APs are received by the master node, and if the master node has not announced a partition request itself, it checks the validity of the proposed new topology by recalculating the costs. If the master node agrees on the partition request, and the there is negligible Wi-Fi traffic to Wi-Fi clients in the network, then the master node broadcasts a partition announcement message. If there are Wi-Fi clients active traffic of which may be affected by a possible channel change, then the master node does not initiate the partition.

The partition announcement message consists of the list of IDs of APs in each mesh island and the respective Wi-Fi channel to be used by the designated mesh islands. For example, considering the scenario depicted in FIG. 4, the announcement message includes the following information: [{{A,B}, 36}, {{C, D, E}, 100}], which should be interpreted as {A,B} forms a mesh island in channel 36, and {C, D,E} forms another mesh island in channel 100.

When partition requests from all APs are received by the master node, and the master node has already announced a partition request itself, it checks the validity of the received proposed new topology by recalculating the costs. If the requests match, then the master node broadcasts a partition announcement message.

If the master node does not agree with the received requested topology, then the master node deduces that the mesh nodes do not have the same set of information on the network state. This problem may arise due to a link cost, which is not updated, and/or which is not distributed in the network. In order to have an up-to-date network state information, master node triggers network state discovery for gathering link state information (FIG. 6: 607) by broadcasting a discover network state message.

(6) When a node receives a partition announcement message (FIG. 8) from the master node, it has any traffic on the interfaces—if there are any interfaces to switch—that are announced to be canceled, the AP switches the traffic on these interfaces to alternative interfaces. That is to say, if the mesh node has active link operating on the channel that is to be switched, for example this link can be an inter mesh island link when the channel is switched, then before switching the channel the mesh node transfers the traffic on the active link to the alternative interface. This way, the Wi-Fi links across different mesh islands are replaced with alternative high-speed interfaces before creating the mesh islands.

Considering the example scenario depicted in FIG. 3 and FIGS. 4, 303 and 306 are such links, and thus, 406 and 407, respectively, replaces these links. After the new links are established and begin carrying traffic, then the AP switches to the Wi-Fi channel as indicated in the partition announcement message.

Figure 4:
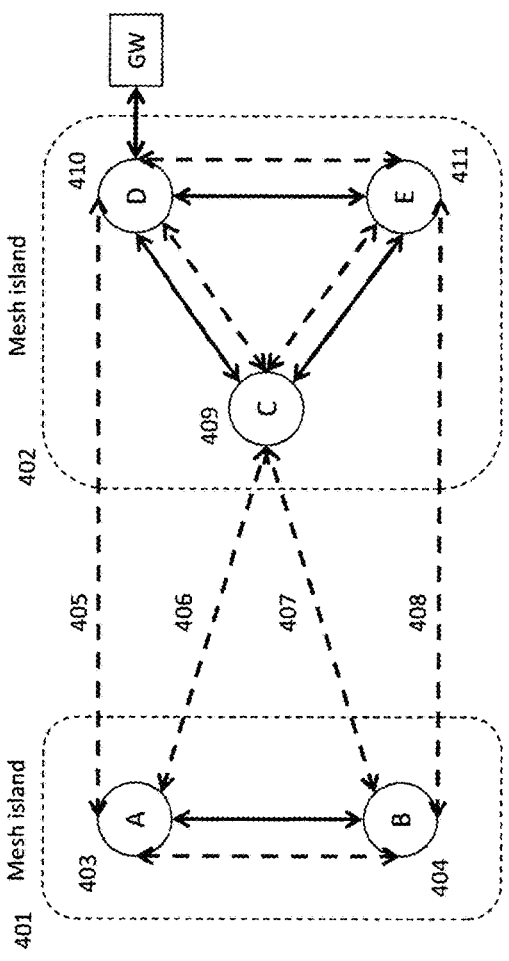
FIG. 4 is a schematic of an exemplary partitioned mesh network.

Reconsidering the example scenario in FIG. 3, in case the proposed partitioning method is used, the example network will be partitioned into two mesh islands as depicted in FIG. 4. The resulting mesh islands are 401 and 402. Each mesh island uses a distinct Wi-Fi 5 GHz channel, which is found by best channel selection method. Since these two mesh islands operate in two distinct Wi-Fi channels, meaning that the intra mesh island Wi-Fi communication is concurrent, the Wi-Fi capacity is significantly increased (almost doubled). Meanwhile inter mesh island communication, i.e., the communication between these two separate mesh islands, 401 and 402, is carried out through the PLC links, 405, 406, 407, 408, that bind 401 and 402.

Figure 7:
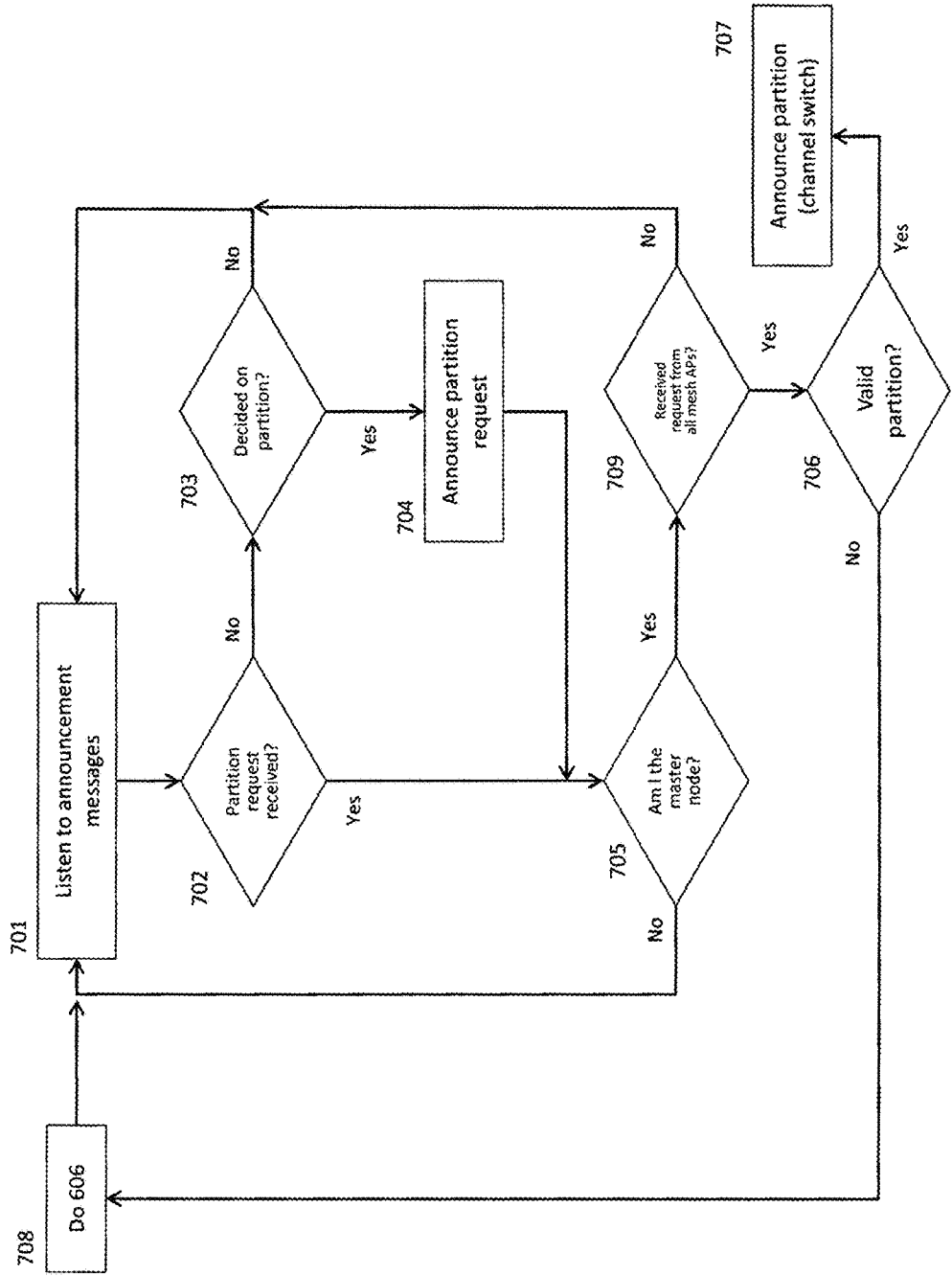
FIG. 7 is a flowchart of a method of implementing partitioning of a mesh network.
Figure 8:
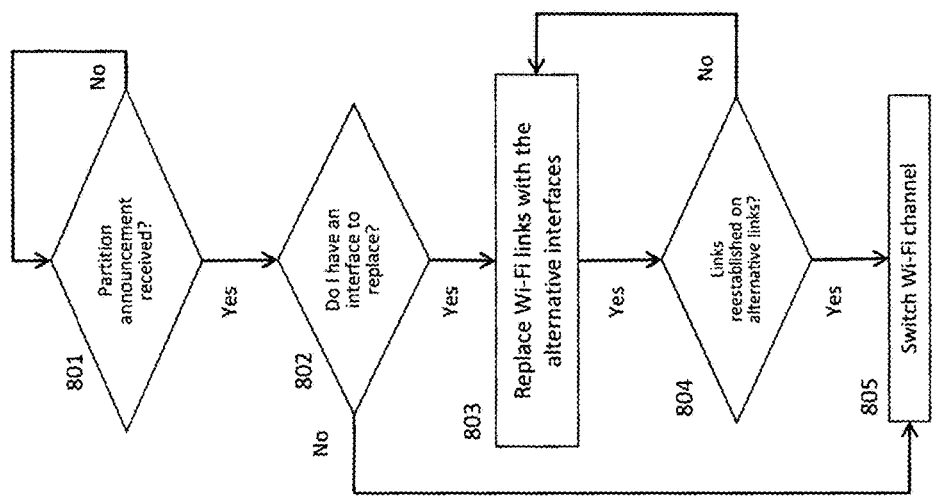
FIG. 8 a flowchart of a method of determining a preferential channel.

Mesh network partitioning is carried out as described in the above steps and as shown in flow charts provided in FIG. 6, FIG. 7 and FIG. 8.

Link rate information is gathered for each possible interface, 601. For the interfaces where multiple channels are available, such as Wi-Fi interfaces, link rate information is gathered for each possible channel. Link information for Wi-Fi is gathered as depicted in flow chart provided in FIG. 5. In one embodiment of the invention, the link rate information is in terms of the link capacity in terms of bits per second, which designate the throughput that can be achieved on that link.

When a mesh node receives channel switch announcement, it operates as depicted in flow chart given in FIG. 8.

The invention claimed is:

1. A network device operable with a hybrid mesh network having a plurality of network and client devices, comprising:
   a processor, a memory, a first network interface and a second network interface, the first network interface and the second network interface each being independently addressable and adapted to enable multiple communication pathways simultaneously within the hybrid mesh network, the processor configured to,
   determine communication characteristics of one or more of the multiple communication pathways,
   measure end-to-end deliverable traffic over the one or more of the multiple communication pathways, and
   partition the hybrid mesh network into two or more mesh islands based on the end-to-end deliverable traffic such that communication within each of the two or more mesh islands is on different non-overlapping wireless channels while increasing the end-to-end deliverable traffic in the hybrid mesh network.

2. The network device according to claim 1, wherein the first network interface is adapted to form a common mesh interface that connects mesh islands, the common mesh interface being one or more of an Ethernet interface and a power line communication (PLC) interface.

3. The network device according to claim 1, wherein the second network interface is adapted to enable communication over Multiple channels thereby enabling non-overlapping communication between different ones of the two or more mesh islands though use of different channels within the different ones of the two or more mesh islands.

4. The network device according to claim 1, wherein the network device is configured to determine one of:
   at least local information regarding the communications characteristics of the multiple communication pathways based on at least one of an amount of traffic on a respective one of the multiple communication pathways and an estimated capacity of the respective one of the multiple communication pathways; and
   the communication characteristics of a channel within a network interface based on at least one of clear channel assessment (CCA), the amount of traffic on the channel, and an estimated capacity of the channel both for incoming and outgoing communications with the network device.

5. The network device of claim 1 adapted periodically to distribute measured communications characteristics to and periodically to receive measured communications characteristics from other network devices within the hybrid mesh network over the first network interface such that distribution is not synchronized between the network devices within the hybrid mesh network.

6. The network device according to claim 4, wherein the network device is configured to,
   determine the local information regarding the communications characteristics of the multiple communication during a channel scan in a scan epoch, and
   halt transmission during the scan epoch, wherein
      a length of the scan epoch being a function of one or more of a number of channels to be scanned, a total time spent scanning a channel and a time spent to switch to a channel to scan.

7. The network device according to claim 6, wherein
   during the scan epoch, the network device scans one or more channels with one or more bandwidths in order to obtain the local information, and wherein
      the scan epoch is not synchronized with a scan epoch of another network device in the hybrid mesh network,
      the one or more channels with one or more bandwidths scanned by the network device are the same one or more channels with one or more bandwidths that are scanned by another network device during the scan epoch of another network device in the hybrid mesh network.

8. The network device according claim 6, wherein
   the scan epoch is initiated by receipt of a signal from a master node, and
   the master node is (i) a mesh access point (AP) that has a highest of a bridge MAC addresses in the hybrid mesh network or (ii) a mesh AP, which is directly connected to a gateway (GW) that is a dynamic host configuration protocol (DHCP) server.

9. The network device according to claim 6, wherein
   the network device broadcasts processed scan results, $\overline{m}_{i,j}$, of the channel scan performed in the scan epoch,
   the processed scan results, $\overline{m}_{i,j}$, of the channel scan are based on a moving average of the latest n samples, where n is a configurable parameter, and
   the processed scan results $\overline{m}_{i,j}$ are obtained by applying a filter over the last n samples, such as a median.

10. The network device of claim 5, wherein at least a most recent distributed and received communications characteristics information is stored locally in the memory in a table, the table including information regarding each interface and each channel within each interface, for each network device within the hybrid mesh network.

11. The network device of claim 1, wherein
    at least one of the first and second network interfaces provides multiple channels,
    partitioning of the hybrid mesh network into two or more mesh islands is determined based on a mechanism which accounts for local communications characteristics of all network devices within the hybrid mesh network,
    the mechanism performs a weighting operation on each channel to obtain a cost metric based on total traffic on each network device within the hybrid mesh network, the weighting operation being based on at least one of traffic, link capacity, and airtime utilization, and the traffic carried over a communications interface k of a network device i for a duration of d seconds is computed as follows:

$$T_i(d)=\Sigma_{k\in W_s}x_k(d)+\Sigma_{k\in W_s}y_k(d),$$

where $W_s$ designates the communication interface, k is a communication link between network device i and another network device, $x_k$ is the traffic coming in and $y_k$ is the traffic going out of the communication link k with network device i and wherein $x_k(d)$ and $y_k(d)$ are determined based on a complex function of x, y, and d x and y being a simple function of d such as $$x_k(d)=\Sigma_{i=0}^{d}x_k(i).$$

12. The network device of claim 11, access point i (AP-i) computes a weight of access point j (AP-j), based on traffic information gathered from all APs, and assuming that there are N APs in the mesh network, as follows:

$$w_j=f(T_1(d),\ldots,T_N(d))$$

and f(.) is computed as follows:

$$w_j = \frac{T_j(d)}{\sum_{k=1}^{N} T_k(d)}$$

such that the weight assigned to AP-j is defined as a ratio of total Wi-Fi traffic on AP-j and total Wi-Fi traffic on the mesh network.

13. The network device of claim 12, wherein the cost metric assigned to channel c is computed as follows:

$$C_i=\Sigma_{k=1}^{N}w_k m_{i,k}$$

and after the cost metrics are computed, channels are sorted in a sorted list of ascending order of their cost metrics, a best channel is a first channel in the sorted list that provides a minimum cost, wherein
$m_{i,k}$ is a negative number, and $w_k$ is ratio of two positive numbers such that cost is negative, and the APs that carry more traffic than the other mesh node, have priority in channel selection.

14. The network device according to claim 1, wherein the network device is configured to,
create a set of all possible network partitions,
determine, for each of the possible network partitions, a best channel for each mesh island of the two or more mesh islands,
determine if the best channel for each mesh island of the two or more mesh islands is same as the best channel for another mesh island of the two or more mesh islands, and
assign the mesh island with the lowest cost the best channel and the another mesh island a next best channel, if the best channel is same among the mesh island and the another mesh island.

15. The network device according to claim 14, wherein the network device is configured to,
determine all possible source destination pairs, and assign costs to each of the possible source destination pairs, and
process the assigned costs to determine one or more of a minimum cost, a maximum cost, a total network cost, an average cost and a cost variance in the hybrid mesh network.

16. The network device according claim 14, wherein the network device determines the best channel for each mesh island by computing an end-to-end capacity of all combinations of routes through the mesh network and selecting a most efficient route.

17. The network device of claim 1, wherein the network device is configured to partition the hybrid mesh network into two or more mesh islands such that total traffic deliverable within the hybrid mesh network increases, wherein
a partition request is announced to the hybrid mesh network by broadcasting or unicasting the partition request.

18. The network device of claim 1, wherein
hysteresis is applied while deciding whether to partition the hybrid mesh network and partitioning only occurs if a capacity of the hybrid mesh network increases by more than a value, wherein the value is greater than 10%, and
a master node is (i) a mesh access point (AP) that has a highest of a bridge MAC addresses in the hybrid mesh network or (i) a mesh AP, which is directly connected to a gateway (GW) that is a dynamic host configuration protocol (DHCP) server.

19. The network device according to claim 1, wherein the network device, is configured to,
receive an instruction from a master network device within the hybrid mesh network to effect a partitioning of the hybrid mesh network according to the instruction,
remain in communication with the hybrid mesh network via a first one of the first network interface and the second network interface and with a mesh island via a second one of the first network interface and the second network interface, and remain in communication with the hybrid mesh network via at least one channel within the second one of the first network interface and the second network interface, and
transfer traffic of an active link to an alternative interface, if the network device has the active link operating on a channel that is being switched and the active link will be an inter-mesh island link when the channel is switched, such that the network device transfers the traffic before switching the channel.

20. A method of operating a hybrid mesh network including a network device having plurality of network devices and client devices, the network device including a processor, a memory, a first independently addressable network interface and a second independently addressable network interface, the first network interface and the second network interface being adapted to enable multiple communication pathways simultaneously within the hybrid mesh network, the method comprising:
determining communication characteristics of one or more of multiple communication pathways within the hybrid mesh network;
measuring end-to-end deliverable traffic over the one or more of the multiple communication pathways; and
partitioning the hybrid mesh network into two or more mesh islands based on the end-to-end deliverable traffic such that communication within each of the two or more mesh islands is on different non-overlapping wireless channels while increasing the end-to-end deliverable traffic in the hybrid mesh network.

* * * * *